United States Patent [19]

Pekau

[11] 3,864,665
[45] Feb. 4, 1975

[54] PROCESS FOR RECORDING ACOUSTIC, SYNTHETIC AND MICROWAVE HOLOGRAMS

[75] Inventor: Dietlind Pekau, Krailling, Germany

[73] Assignee: Siemens Aktiengesellschaft, Berlin and Munich, Germany

[22] Filed: Feb. 14, 1973

[21] Appl. No.: 332,374

[30] Foreign Application Priority Data
Feb. 21, 1972 Germany............................. 2208061

[52] U.S. Cl................. 340/5 H, 73/67.5 H, 343/17, 346/110 R
[51] Int. Cl. ........................................... G03b 41/00
[58] Field of Search .............. 73/67.5 H; 181/.5 NP; 340/5 H; 346/107 R, 108, 109, 110 R; 343/17

[56] References Cited
UNITED STATES PATENTS
3,559,465   2/1971   Preston, Jr....................... 340/5 H X OTHER PUBLICATIONS
The International Dictionary of Physis and Electronics, D. Van Nostrand Co., 1956, page 970.

Primary Examiner—Richard A. Farley
Attorney, Agent, or Firm—Hill, Gross, Simpson, Van Santen, Chiara & Simpson

[57] ABSTRACT

The process of recording acoustic, synthetic and microwave holograms in which the object wave field emanating from an object is scanned point by point and row by row by a receiving transducer which produces electrical output signals which are transformed into light signals that are recorded as holgrams on a light sensitive medium in rows characterized by recording every row twice on the light sensitive medium to improve the signal to noise ratio of an image reconstructed from the hologram. Preferably, the second recording of each row is disposed between the first recorded rows and is displaced from its corresponding first recorded row in a direction parallel to the first recorded row.

6 Claims, 2 Drawing Figures

PROCESS FOR RECORDING ACOUSTIC, SYNTHETIC AND MICROWAVE HOLOGRAMS

BACKGROUND OF THE INVENTION

1. Field of the Invention

The present invention is directed to a process for recording acoustic, synthetic and microwave holograms in which a receiving transducer scans an object field emanating from an object to produce electrical output signals which are subsequently transformed into light signals and are recorded on a light sensitive medium to form the hologram.

2. Prior Art

In the reconstruction of holograms, in order to spatially separate the image of the object from non-diffracted light and the conjugated image, conventional holography processes utilize a reference wave which strikes at an angle to the object wave during the recording of the hologram. In acoustic and microwave holography since linear receivers are employed for the reception of the microwaves or sound waves, the reference wave is generally added electrically. There are two possibilities of electronically producing the reference wave. The first possibility consists in scanning the sound field point by point and at every scanned point adding a sound or microwave frequency reference signal to the received signal. This results in a reference wave being simulated which runs normal to the hologram plane. In this possibility, the object must be displaced perpendicular to the hologram normal in order to obtain the necessary angle between the object and reference wave. In the second possibility, a reference wave, which falls obliquely to the hologram plane, is simulated by changing the phase of the reference signal, which has the same frequency, at every scanned point.

Since the maxim angle between the object and reference waves is limited in many cases, there are regions of the object which occur at an angle to the hologram normal which angle lies in the vicinity of the angle of incidence of the reference wave. Therefore, in the reconstruction of holograms, these object regions are either separated only slightly from the non-diffracted light or partly superimposed by the non-diffracted light. The non-diffracted light is then filtered out in the Fourier transformation plane of the hologram but in the particular case of the small angle, a considerable impairment of the signal/noise ratio may occur.

To improve the signal to noise ratio, an improved recording process has been suggested in a copending United States Patent Application by Dietlind Pekau and Reiner Diehl entitled "A PROCESS FOR RECORDING ACOUSTIC, SYNTHETIC AND MICROWAVE HOLOGRAMS," Ser. No. 328,742 (Docket No. 73,025) filed Feb. 1, 1973, which issued on June 18, 1974 as U.S. Pat. No. 3,818,427, and assigned to the same assignee. In this process, every second row is displaced with respect to the first row in a direction parallel to the rows of recorded signals and this displacement aids in separating the non-diffracted light from the reconstructed image.

During reconstruction, the row displacement causes a scanning frequency of the amplitude and phase information of the object wave field to be effectively halved while maintaining a uniform band width and while the row displacement does not affect the constant to slowly varying component of the hologram transmission which produces a non-diffracted light during reconstruction. Thus the scanning frequency of the non-diffracted component amounts to double the recorded scanning frequency of the image information. In the Fourier transformation plane of the hologram, these components are spatially separated by this frequency difference so that the non-diffracted light can be filtered out without impairing the signal to noise ratio. However this process has a disadvantage which is that the viewing angle is halved and causes an undesirable reduction in the maximum portrayable object width.

SUMMARY OF THE INVENTION

The present invention is directed to a process for the recording of acoustic, synthetic or microwave holograms which during reconstruction of the hologram enable the complete separation of the reconstruction image from the non-diffracted light so that a considerable improved signal to noise ratio can be obtained and the viewing angle is not reduced. The process records the hologram by scanning point by point and row by row the object wave field emanating from an object by a receiving transducer which produces an electrical output signal which is transformed into light signals that are recorded as holograms on a light sensitive medium in rows with the improvement comprising recording each row scanned by the transducer twice to provide a first record row and a second recorded row. The recording if each second recorded row is controlled to displace the position of the second recorded row both perpendicular and parallel to the corresponding first recorded row. Preferably, the perpendicular displacement is approximately one-half of the distance between adjacent first recorded rows. Preferably, the electrical output signals are transformed into light signals by being applied to an oscilloscope and the displacement can be accomplished by control of the deflecting voltages. The desired displacement can also be accomplished either by passing the electrical signals through a doubling circuit prior to applying to the oscilloscope or by applying a delay to the electrical signals by passing them through a delay circuit prior to applying to the oscilloscope.

DESCRIPTION OF THE PREFERRED EMBODIMENTS

The principles of the present invention are particularly useful in the method of recording an acoustic, synthetic or microwave hologram. For example, for recording of acoustic holograms, the amplitude and phase distribution of a sound field produced by a coherently irradiate object is scanned on a receiving plane $(x_0, y_0)$ by a receiver transducer such as a sound receiver. A coherent reference signal which has thus been formed is visibly represented on electrooptical transducer and is then stored by being recorded on film. The sound receiver can be a matrix of sound transducers which are electrically scanned or a single sound transducer which is mechanically moved over the receiving plane and thus scans the sound field in rows having predetermined spaced intervals.

Figure 1:
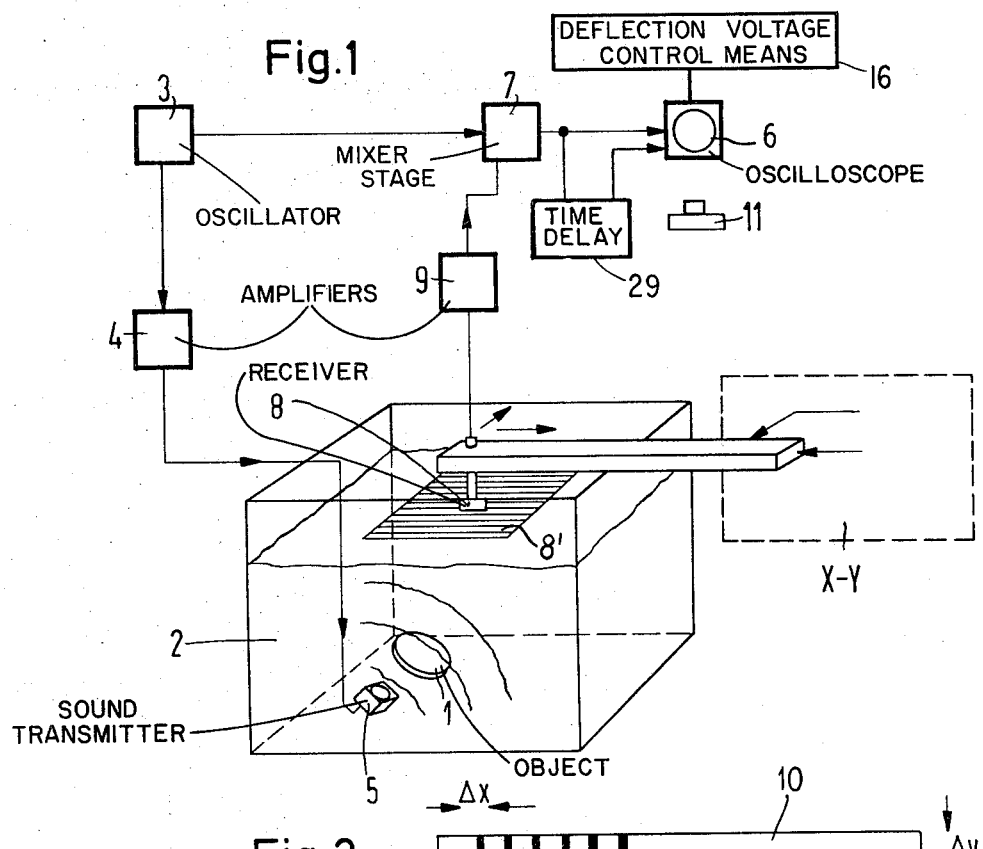
FIG. 1 schematically shows an arrangement for executing the recording process according to the present invention.

In FIG. 1, an example of a device for performing the process is illustrated. An object which is to be recorded for example a metal plate 1, which has holes, is arranged in a tank 2 containing liquid. To irradiate the object 1, an oscillator 3 produces a signal which is amplified by an amplifier 4 which drives a sound transmitter 5 which is disposed in the tank 2 and can be a transducer which irradiates the object 1 with coherent sound waves. The sound waves from the transducer 5 are diffracted by the object 1 to produce a sound field having an amplitude and phase distribution in a receiving plane 8' which is on the liquid surface of the tank 2. The sound field in plane 8' is scanned by an ultrasonic receiver 8.

The ultrasonic receiver 8 is a receiving transducer which as illustrated is moved to scan the sound field in the receiving plane 8' point by point along rows. The movement of the receiver 8 is controlled in two dimensions by a mechanical shifting device identified as X-Y. The receiver 8 converts the ultrasonic signal into an electrical signal which is amplified by amplifier 9 and then conducted to a mixer stage 7. In the mixer stage 7, a signal, which is obtained from the oscillator 3, is added to the electrical signal obtained from the ultrasonic receiver 8. A resultant interference signal formed by the mixing of the coherent reference signal with the electrical signal from the receiver 8 is conducted to an oscilloscope 6 which converts the electrical signal to an optical signal by displaying the signal on a screen. The screen display of the oscilloscope 6 is then recorded by the camera 11.

Figure 2:
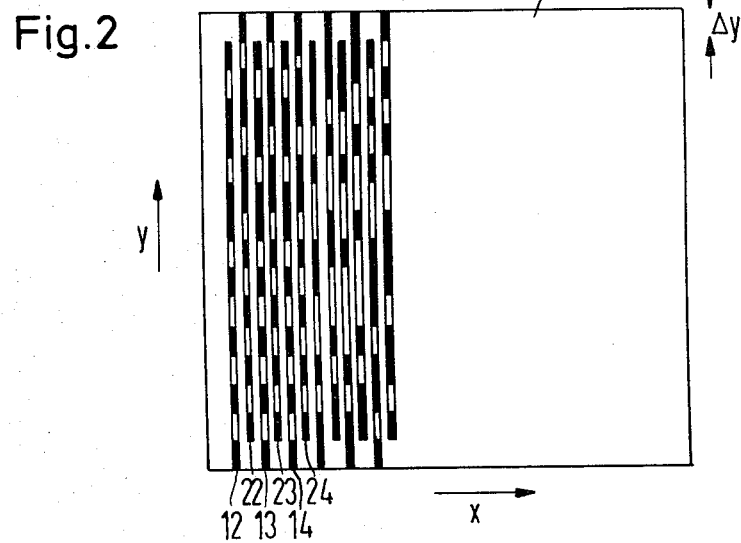
FIG. 2 illustrates a hologram with displaced rows produced by the process of the present invention.

The camera 11 records the optical signals from the screen of the oscilloscope 6 on a storage medium, such as a light sensitive medium 10 (FIG. 2) in first recorded rows 12, 13 and 14 and respective second recorded rows 22, 23 and 24. Each of the second recorded rows 22, 23 and 24 is displaced perpendicular from the respective first recorded row 12, 13 or 14 by a distance $\Delta x$ which is preferably onehalf the distance between adjacent first recorded rows such as 12 and 13. Each of the second recorded rows 22, 23 and 24 is also displaced in a parallel direction to the rows 12, 13 and 14 by a distance $\Delta y$ which is a small amount. The first recorded rows 12, 13 and 14 form a first hologram system and the second recorded rows 22, 23 and 24 form a second hologram system which is identical to the first hologram system and is superimposed therein.

To produce the two superimposed identical hologram systems defined by rows 12, 13 and 14 and rows 22, 23 and 24, respectively, with the desired displacement therebetween, the deflecting voltage of the oscilloscope 6 can be controlled by a deflection voltage control means 16 during the recording of the first and second recorded rows for each row scanned by the transducer 8. Another method of obtaining the desired displacement is by passing the electrical output signal emitted by the mixer stage 7 is supplied directly to the oscilloscope 6 and is supplied through a delay circuit or time delay 29 prior to being applied to the oscilloscope 6.

During reconstruction of two superimposed identical hologram systems, the repetition of each row causes the scanning frequency of the constant or slowly varying component of the hologram transmission to be doubled and this component is not influenced by the slight displacement of the rows of the second hologram system in both the perpendicular and parallel direction from the rows of the first hologram system. However, the parallel and right angle displacement between the rows of the two systems causes the scanning frequency of the object information to remain constant with only a mere phase displacement occurring. Thus the two systems with the above mentioned displacement enables a reduction in the viewing angle to be avoided while obtaining an increase in the scanning frequency of the non-diffracted light and a decrease in the scanning frequency of the object information. As a result of the frequency difference, the reconstructed image and the non-diffracted light are spatially separated at the Fourier transformation plane of the hologram. Thus by using a mask with a light transmitting aperture or area, the non-diffracted light can be filtered or separated from the reconstructed image of the object information without impairing the signal to noise ratio.

During reconstruction of the pair of identical hologram systems on the medium 10, the systems are illuminated with a convergent laser beam which has a focal plane. Due to the illumination of the laser beam, a reconstruction image of the object is produced shortly before the focal plane and a conjugated image together with the higher order of diffraction is formed behind the focal plane of the laser beam. Due to the row duplication of the first and second hologram systems, the first order of diffraction of the reconstructed image is spatially separated from the non-diffracted light and the first order of diffraction of the constant component of the hologram transmission. The non-diffracted light and the higher order of diffraction which do not contribute to the reconstructed object image can be filtered out by using a mask having a light transmitting aperture.

Although minor modifications might be suggested by those versed in the art, it should be understood that I wish to embody in the scope of the patent granted hereon all such modifications as reasonably and properly come within the scope of my contribution to the art.

I claim:

1. In a process of recording acoustic, synthetic and microwave holograms in which process an object wave field emanating from an object is scanned point by point and row by row by a receiving transducer which produces an electrical output signal which are transformed into light signals that are recorded as holograms on a light sensitive medium point by point in rows, the improvement comprising recording each row a second time on the light sensitive medium to provide a first and second recorded row for each row scanned by the receiving transducer, the recording of each second recorded row on the light sensitive medium being controlled to displace the position of the second recorded row both perpendicular and parallel to the position of its respective first recorded row.

2. In a process according to claim 1, wherein the perpendicular displacement of the second recorded row from its respective first recorded row is approximately one-half the perpendicular distance between two adjacent first recorded rows.

3. In a process according to claim 1, wherein the electrical output signals are transformed into light signals by being applied to an oscilloscope screen to produce an optical image which image is recorded by a light sensitive medium and wherein the step of displacing every second recorded row with respect to every first recorded row is accomplished by controlling the deflecting voltages of the oscilloscope.

4. In a process according to claim 3, wherein the perpendicular displacement of the second recorded row from its respective first recorded row is approximately one-half the perpendicular distance between two adjacent first recorded rows.

5. In a process according to claim 1, wherein the electrical output signals are transformed into light signals by being applied to an oscilloscope screen to produce an optical image which image is recorded by a light sensitive medium and wherein during the step of recording each row a second time with displacement is accomplished by applying a time delay to the electrical signal output of the receiving transducer during the second recording of each row.

6. In a process according to claim 5, wherein the perpendicular displacement of the second recorded row from its respective first recorded row is approximately one-half the perpendicular distance between two adjacent first recorded rows.

* * * * *